United States Patent
Zheng et al.

(10) Patent No.: US 11,768,058 B2
(45) Date of Patent: Sep. 26, 2023

(54) TRANSIENT ELECTROMAGNETIC FIELD DETECTION APPARATUS HAVING DYNAMIC EMISSION SOURCE IN COMBINATION WITH STATIC EMISSION SOURCE AND TRANSIENT ELECTROMAGNETIC FIELD DETECTION METHOD FOR DISCOVERING UNEXPLODED ORDNANCE

(71) Applicants: TSINGHUA UNIVERSITY, Beijing (CN); BEIJING INSTITUTE OF SATELLITE ENVIRONMENTAL ENGINEERING, Beijing (CN)

(72) Inventors: Xiao-Ping Zheng, Beijing (CN); Zhen-Yuan Sun, Beijing (CN); Hua Geng, Beijing (CN); Xiao-Jiao Deng, Beijing (CN); Bin Wang, Beijing (CN)

(73) Assignees: TSINGHUA UNIVERSITY, Beijing (CN); BEIJING INSTITUTE OF SATELLITE ENVIRONMENTAL ENGINEERING, Beijing (CN)

( * ) Notice: Subject to any disclaimer, the term of this patent is extended or adjusted under 35 U.S.C. 154(b) by 485 days.

(21) Appl. No.: 17/000,263

(22) Filed: Aug. 21, 2020

(65) Prior Publication Data

US 2021/0055083 A1  Feb. 25, 2021

(30) Foreign Application Priority Data

Aug. 23, 2019  (CN) .......................... 201910783855.9

(51) Int. Cl.
  *F41H 11/136*  (2011.01)
  *G01V 3/10*  (2006.01)
(52) U.S. Cl.
  CPC ............. *F41H 11/136* (2013.01); *G01V 3/10* (2013.01)

(58) Field of Classification Search
  CPC .......... F41H 11/136; G01V 3/10; G01V 3/08; G01V 3/15
  See application file for complete search history.

(56) References Cited

U.S. PATENT DOCUMENTS 6,064,209 A * 5/2000 Banerjee .................. G01V 3/15
  324/345
6,084,412 A * 7/2000 Guo ......................... G01V 3/15
  324/334

(Continued)

FOREIGN PATENT DOCUMENTS

CN  103605164  2/2014
CN  105181791  12/2015

(Continued)

OTHER PUBLICATIONS

L. R. Pasion, "Detecting unexploded ordnance with time domain electromagnetic induction," T, University of British Columbia, 1999 (Year: 1999).*

(Continued)

*Primary Examiner* — Daniel R Miller

(57) ABSTRACT

A detection method for discovering an unexploded ordnance includes: surrounding a detection region with a transmitting coil and surrounding a detection site with a second receiving coil; conducting the transmitting coil with a second electric current; respectively acquiring a plurality of second feedback signals at a plurality of second feedback time points; partitioning the transmitting coil into a plurality of dipoles, and acquiring a plurality of distance values r respectively between the plurality of dipoles and the detection site; respectively calculating feedback depths according to feedback time periods; respectively calculating apparent resistivity values corresponding to the feedback depths; obtaining an apparent resistivity distribution in depth at the detection site according to the apparent resistivity values and (Continued)

the feedback depths; and judging whether there is any unexploded ordnance at the detection site according to the apparent resistivity distribution in depth.

18 Claims, 5 Drawing Sheets

(56) References Cited

U.S. PATENT DOCUMENTS

| | | | |
|---|---|---|---|
| 2002/0030192 A1 | 3/2002 | Nikolaev et al. | |
| 2002/0030492 A1* | 3/2002 | Guo | G01V 3/12 324/334 |
| 2004/0051619 A1* | 3/2004 | Bryan | G01V 3/17 336/192 |
| 2016/0131789 A1 | 5/2016 | Bosnar | |
| 2017/0123093 A1* | 5/2017 | West | G01V 3/28 |

FOREIGN PATENT DOCUMENTS

| | | |
|---|---|---|
| CN | 105353428 | 2/2016 |
| CN | 105759316 | 7/2016 |
| CN | 106772632 | 5/2017 |
| CN | 107367764 | 11/2017 |
| CN | 108287367 | 7/2018 |
| CN | 108802851 | 11/2018 |
| CN | 109270579 | 1/2019 |
| CN | 109358367 | 2/2019 |
| CN | 109507736 | 3/2019 |
| DE | 19549250 C1 * | 4/1997 |
| WO | WO-0171387 A2 * | 9/2001 |
| WO | WO-2007147199 A1 * | 12/2007 |
| WO | WO-2012178158 A1 * | 12/2012 |
| WO | WO-2013141969 A2 * | 9/2013 |

OTHER PUBLICATIONS

Pasion, Leonard & Billings, Stephen & Oldenburg, Douglas. (2001). Uxo Discrimination Using Time Domain Electromagnetic Induction (Year: 2001).*

JD McNeill, Technical Note TN-7, Applications of Transient Electromagnetic Techniques, Geonics Limited, 1980 (Year: 1980).*

JD McNeill, Technical Note TN-10, EM37 Ground Transient Electromagnetic System: Calculated Depth of Exploration, Geonics Limited, 1980 (Year: 1980).*

JD McNeill, Technical Note TN-27, Principles and Application of Time Domain Electromagnetic Techniques for Resistivity Sounding, Geonics Limited, 1994 (Year: 1994).*

Zhang, Linlin, "Development of Engineering Transient Electromagnetic Detector", <Chinese Master's Theses Full-Tex Database Engineering Science and Technology II>, No. 2, Feb. 15, 2017, pp. 7-9,17-19,35-38 and 46.

Les P. Beard et al. "Filed tests of an experimental helicopter time-domain electromagnetic system for unexploded ordnance detection", <Geophysics>, Feb. 6, 2004, pp. 664-673.

Zhi-peng Qi et al. "Drone-borne transient electromagnetic system and its application in UXO detection" <SEG International Exposition and 88th Annual Meeting>, Dec. 31, 2018, p. 2776.

Huang, Lijun, et al. "The application of grounded source transient electromagnetic method to the oil filed" <Geophysical & Geochiemical Exploration>vol. 29 No. 4, Aug. 31, 2005, p. 316.

Xue, Guoqiang, et al. "Short-offset TEM technique with a grounded wire source for deep sounding" <Chinese Journal of Geophysics>, vol. 56, Jan. 31, 2013, pp. 256-257.

Sun, Jiajia et al. "Multidomain petrophysically constrained inversion and geology differentiation using guided fuzzy c-means clustering" <Geophysics>, vol. 80, No. 4, Jul.-Aug. 2015, pp. ID1-ID18.

Li, Yaoguo et al. "3-D inversion of magnetic data" <Geophysics>, vol. 61, No. 2, Mar.-Apr. 1996, pp. 394-408.

Guan, Zhining et al. "Inversion of Gravity and Magnetic Anomalies Using Pseudo-BP Neural Network Method and Its Application" <Acta Geophysica Sinica>, vol. 41, No. 2, Mar. 1998, pp. 243-251.

P. Shamsipour et al. "3D stochastic inversion of magnetic data" <Journal of Applied Geophysics> 73(2011), pp. 336-347.

Geng, Meixia et al. "3D inversion of potential field data using a marginalizing probabilistic method" <Geophysics>, vol. 83, No. 5, Sep.-Oct. 2018, pp. G93-G106.

Li, Xiaokang et al. "Overview on unexploded ordnance problem and a solution: The geophysical scheme" <China Mining Magazine>, vol. 19, Dec. 31, 2010, part 2.

Zhao, Gaishan. "genetic algorithm for solving nonlinear optimization problem" <Progress in Geophysics>vol. 7, No. 1, Feb. 1992, pp. 90-97.

* cited by examiner

TRANSIENT ELECTROMAGNETIC FIELD DETECTION APPARATUS HAVING DYNAMIC EMISSION SOURCE IN COMBINATION WITH STATIC EMISSION SOURCE AND TRANSIENT ELECTROMAGNETIC FIELD DETECTION METHOD FOR DISCOVERING UNEXPLODED ORDNANCE

CROSS-REFERENCE TO RELATED APPLICATIONS

This application claims all benefits accruing under 35 U.S.C. § 119 from China Patent Application No. 201910783855.9 filed on Aug. 23, 2019 in the China National Intellectual Property Administration, the content of which is incorporated by reference herein. This application is related to a commonly-assigned application, entitled "METHOD FOR DISCOVERING UNEXPLODED ORDNANCE BY DETECTING TRANSIENT ELECTROMAGNETIC FIELD IN COMBINATION WITH MAGNETIC FIELD GRADIENT" (U.S. patent application Ser. No. 17/000,238), the content of which is also hereby incorporated by reference.

FIELD

The present disclosure relates to the field of detection technology, in particular to a transient electromagnetic field detection apparatus and a transient electromagnetic field detection method for discovering unexploded ordnance.

BACKGROUND

Since the end of the Second World War, huge amount of unexploded ordnances still present in many countries, which pose a grave threat to human lives and health, as well as environmental concern. For example, unexploded chemical weapons may be triggered and leak highly toxic chemicals. So, it would be of great importance to develop techniques to discover the unexploded ordnances.

SUMMARY

A detection method for discovering an unexploded ordnance is provided, includes: surrounding a detection region with a transmitting coil and surrounding a detection site in the detection region with a second receiving coil; conducting the transmitting coil with a second electric current to transmit a second detecting signal to the detection region; respectively acquiring a plurality of second feedback signals at a plurality of second feedback time points, the second feedback signals being second induced electromotive force signals of the second receiving coil; partitioning the transmitting coil into a plurality of dipoles, and acquiring a plurality of distance values r respectively between the plurality of dipoles and the detection site; respectively calculating feedback depths according to feedback time periods, the feedback time periods being periods of time between the second feedback time points and an initial time point of the conducting the transmitting coil with the second electric current; respectively calculating apparent resistivity values corresponding to the feedback depths on the basis of the second feedback signals, the feedback time periods, the distance values r, and the second electric current; obtaining an apparent resistivity distribution in depth at the detection site according to the apparent resistivity values and the feedback depths; and judging whether there is any unexploded ordnance at the detection site according to the apparent resistivity distribution in depth.

A transient electromagnetic field detection apparatus includes a transmitting coil configured to surround the detection region, a second receiving coil configured to surround the detection site in the detection region, a transmitting device electrically connected to the transmitting coil, a receiving device electrically connected to the second receiving coil, and a controller respectively and electrically connected to the transmitting device and the receiving device.

In the present disclosure, in detection at a specific detection region which may be previously determined as an abnormal region, the transmitting coil can be fixed at the detection region, while the second receiving coil can be moved from one detection site to another detection site, or multiple second receiving coils can be fixed at multiple detection sites to perform detections at the same time, to obtain an apparent resistivity spatial distribution map of the abnormal region. The apparent resistivity spatial distribution map can accurately reflect the real situation of the underground space of the detection region, thereby improving exploration accuracy.

DETAILED DESCRIPTION

For a clear understanding of the technical features, objects and effects of the present disclosure, specific embodiments of the present disclosure will now be described in detail with reference to the accompanying drawings. It is to be understood that the following description is merely exemplary embodiment of the present disclosure, and is not intended to limit the scope of the present disclosure.

Use of ordinal terms such as "first", "second", etc., to modify an element does not by itself connote any priority, precedence, or order of one element over another or the temporal order in which acts of a method are performed. Rather, unless specifically stated otherwise, such ordinal terms are used merely as labels to distinguish one element having a certain name from another element having a same name (but for use of the ordinal term). For example, a "first feedback signal" may be so named merely to distinguish it from, e.g., a "second feedback signal". The mere usage of the ordinal numbers "first" and "second" before the term "feedback signal" does not indicate any other relationship between the two feedback signals, and likewise does not indicate any other characteristics of either or both feedback signals.

A transient electromagnetic field detection method involves conducting a transmitting coil with a changing electric current to generate a primary magnetic field pervading a detection region, which induces an eddy current in an electrical conducting object, such as an unexploded ordnance, in the detection region. The eddy current in turn induces a secondary magnetic field. The secondary magnetic field is detected by a receiving coil which has an induced voltage changed with the secondary magnetic field. The induced voltage is measured to obtain an induced electromotive force signal. When the primary magnetic field suddenly disappears, the eddy current and the secondary magnetic field will not immediately disappear but decay in a period of time. Correspondingly, the induced electromotive force signal will have a decay curve. The characteristics of the decay curve of the induced electromotive force signal representing the secondary magnetic field can reflect the size, depth, and electrical property of the electrical conducting object.

Figure 1:
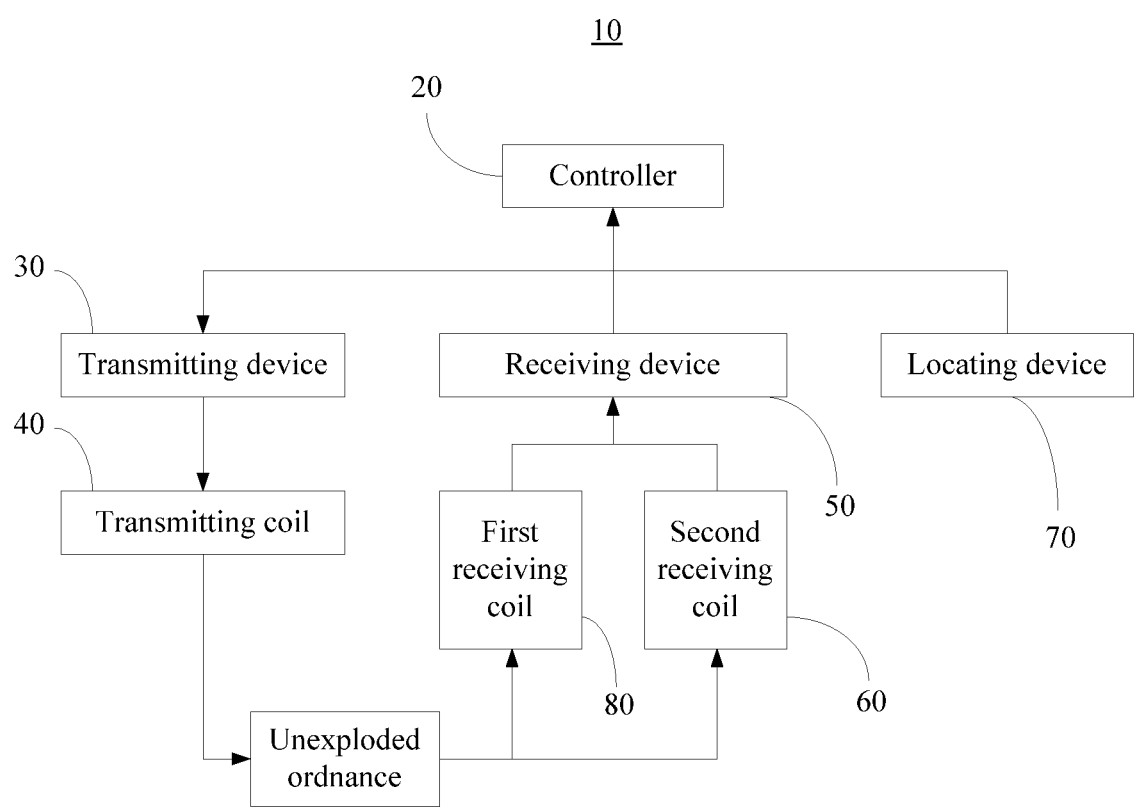
FIG. 1 is a schematic view of an electrical connection of a magnetism detection apparatus according to an embodiment of the present disclosure.
Figure 2:
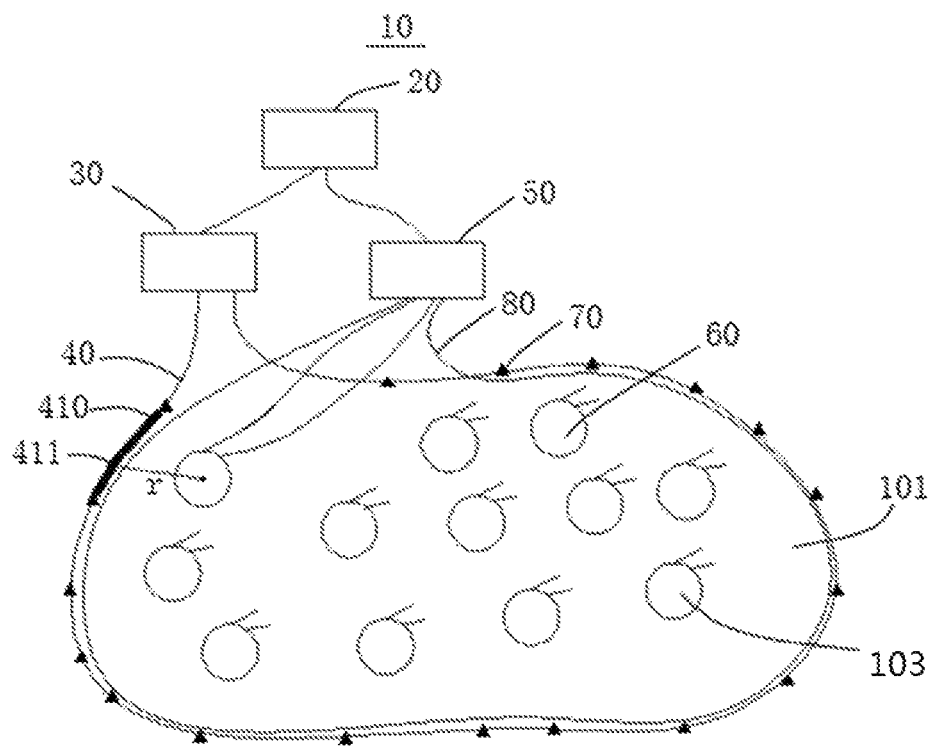
FIG. 2 is a schematic structural view of an embodiment of the magnetism detection apparatus performing detection at a detection region of a target area.

Referring to FIGS. 1 and 2, an embodiment of a transient electromagnetic field detection apparatus 10 for discovering an unexploded ordnance is provided in the present disclosure. The detection apparatus 10 includes a controller 20, a transmitting device 30, a transmitting coil 40, a receiving device 50, a first receiving coil 80, a second receiving coil 60, and a locating device 70.

The transmitting device 30 can be respectively and electrically connected to the controller 20 and the transmitting coil 40. In detection, the transmitting coil 40 can be placed at a detection region 101 of a target area. The transmitting coil 40 surrounds the detection region 101. The controller 20 can be configured to control the transmitting device 30. Under the control of the controller 20, the transmitting device 30 is configured to conduct the transmitting coil 40 with an electric current so as to transmit a detecting signal (i.e., the primary magnetic field) to the detection region 101. The transmitting device 30 is also configured to record an initial time point of transmitting the detecting signal, and send the initial time point to the controller 20. The electric current can be a first electric current to transmit a first detecting signal which induces a secondary magnetic field detected by the first receiving coil 80, or a second electric current to transmit a second detecting signal which induces a secondary magnetic field detected by the second receiving coil 60. The values of the first and second electric currents can be the same or different.

The receiving device 50 can be respectively and electrically connected to the controller 20 and the first receiving coil 80. In detection, the first receiving coil 80 can be placed at the detection region 101. The first receiving coil 80 surrounds the target detection region 101. The receiving device 50 is configured to respectively acquire a plurality of first feedback signals at a plurality of first feedback time points by measuring induced voltages of the first receiving coil 80, and configured to record the corresponding first feedback time points. The first feedback signals are measured induced electromotive force signals obtained by measuring the induced voltages of the first receiving coil 80.

The controller 20 can be further configured to receive the first feedback signals and the first feedback time points from the receiving device 50, plot a first curve with the first feedback signals and the first feedback time points, and determine whether the detection region 101 is an abnormal region by judging whether the first curve is an abnormal curve. If the first curve is the abnormal curve, then the target detection region 101 is the abnormal region. The first curve is plotted according to the first feedback signals and the first time points to represent the induced electromotive force decaying with time. The abnormal curve indicates a higher value of the induced electromotive force compared with a normal curve or a reference curve. In an embodiment, the controller 20 can include a memory to store information such as the first feedback signals, the first feedback time points, and the reference curve, and to store software and/or programs. The controller 20 can include a processor to execute the software and/or programs thereby comparing the first curve and the reference curve.

The receiving device 50 can also be electrically connected to the second receiving coil 60. In detection, the second receiving coil 60 can be placed to surround a detection site 103 in the detection region 101 which may be the abnormal region. The detection site 103 is a local area of the detection region 101, and the local area is surrounded by the second receiving coil 60. The receiving device 50 is configured to respectively acquire a plurality of second feedback signals at a plurality of second feedback time points by measuring induced voltages of the second receiving coil 60 surrounding the detection site, and configured to record the corresponding second feedback time points. The second feedback signals are measured induced electromotive force signals obtained by measuring the induced voltages of the second receiving coil 60.

The controller 20 can be further configured to receive the second feedback signals and the second feedback time points from the receiving device 50. In an embodiment, the controller 20 can include a memory to store information such as the second feedback signals and the second feedback time points.

In an embodiment, the apparatus 10 includes a plurality of detection sites 103 located in one detection region 101. The detection apparatus 10 can include only one second receiving coil 60. The one second receiving coil 60 can be placed to surround the plurality of detection sites 103 one after another to separately perform the detection at each detection site 103. In another embodiment, the detection apparatus 10 can include a plurality of second receiving coils 60. The number of the second receiving coils 60 can be the same as the number of the detection sites 103. The plurality of second receiving coils 60 can be placed to respectively surround the detection sites 103 in a one-to-one manner, so that the detections can be performed at the plurality of detection sites 103 simultaneously. In this embodiment, the receiving device 50 can be respectively and electrically connected to the plurality of second receiving coils 60 at the same time. It should be understood that the number of the second receiving coils 60 can also be larger than one and smaller than the number of the detection sites 103.

Figure 3:
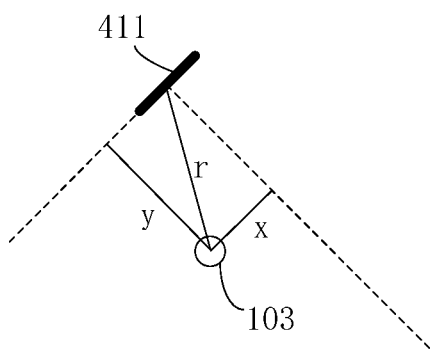
FIG. 3 is a schematic view showing an embodiment of a method to locating a relative coordinate of a dipole with respect to a detection site.
Figure 4:
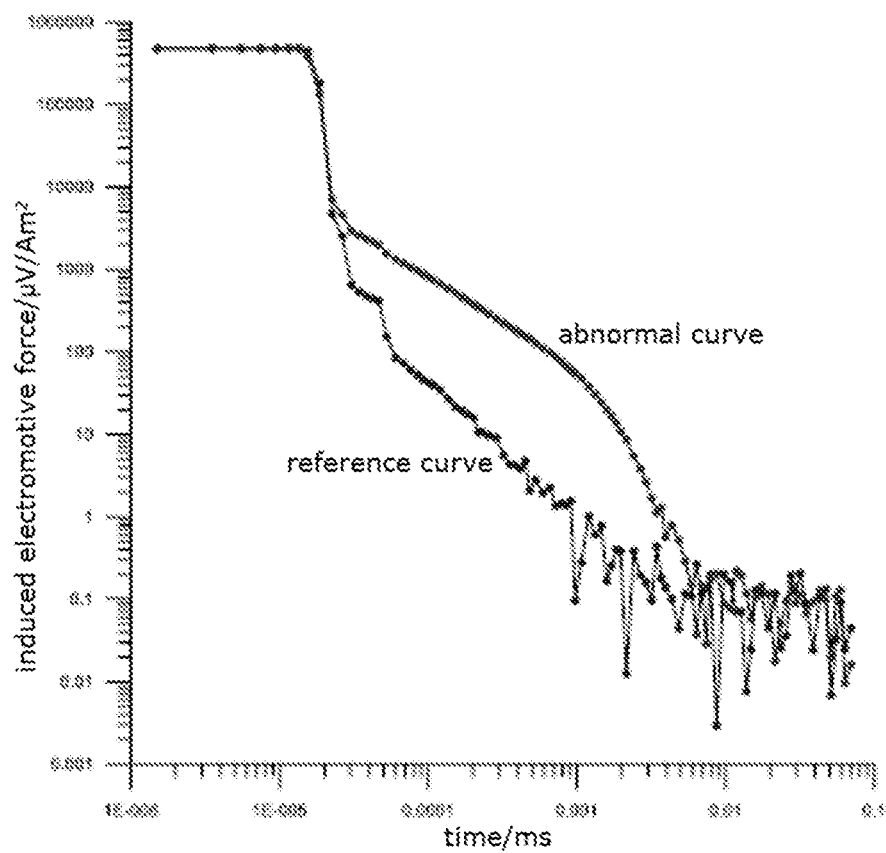
FIG. 4 shows curves of induced electromotive forces changed with time corresponding to abnormal and normal regions according to an embodiment of the present disclosure.

The controller 20 can be further configured to acquire a plurality of distance values r between multiple points of the transmitting coil 40 and the detection site 103. In an embodiment, the apparatus 10 includes a plurality of locating devices 70. The locating devices 70 can be located on the transmitting coil 40 and electrically connected to the controller 20 to locate the multiple points of the transmitting coil 40. In another embodiment, the apparatus 10 includes a single locating device 70 configured to move along the transmitting coil 40 to locate the multiple points of the transmitting coil 40. Referring to FIG. 2 and FIG. 3, in an embodiment, the transmitting coil 40 can be seen as being consisted of a plurality of dipoles 411 connected one by one.

That is, one dipole 411 can be a small section of the transmitting coil 40. The distance values r can be acquired from relative coordinates (x, y) of respective dipoles 411 of the transmitting coil 40 with respect to the detection site 103. The relative coordinates (x, y) of respective dipoles 411 can be acquired via the locating device 70. The locating device 70 can be a real-time kinematic locating device.

The controller 20 can be further configured to calculate feedback time periods between respective second feedback time points and the initial time point, and calculate feedback depths corresponding to the respective second feedback time points according to feedback time periods. The feedback depth is the depth of the location that the second feedback signal corresponds to. The later the second feedback signal being acquired, the deeper the location the second feedback signal corresponds to.

The controller 20 can be further configured to calculate apparent resistivity values corresponding to the feedback depths (and to the second feedback time points) in a one-to-one manner on the basis of the second feedback signals, the feedback time periods, the distance values r (or the lengths of the dipoles 411 and the relative coordinates (x, y) of the dipoles 411 in an embodiment), and the second electric current. The controller 20 can be further configured to obtain an apparent resistivity spatial distribution in depth below the detection site 103 according to the apparent resistivity values and the feedback depths corresponding to the second feedback time points, and judge whether there is any unexploded ordnance at the detection site according to the apparent resistivity spatial distribution in depth below the detection site.

The controller 20 can include a processor to execute the software and/or programs stored on the memory, thereby acquiring the plurality of distance values r, calculating the feedback time periods, the feedback depths, the apparent resistivity values, obtaining the apparent resistivity spatial distribution in depth, and judging whether there is any unexploded ordnance at the detection site.

In the embodiments of the present disclosure, in detection in a relatively large target area, the target area can be divided into a plurality of detection regions 101. Both the transmitting coil 40 and the first receiving coil 80 can be moved from one detection region 101 to another detection region 101 to perform detections at the specific detection regions 101, thereby quickly finding out the abnormal region from the plurality of detection regions 101. This detection manner improves exploration efficiency and can be called as dynamic emission source type detection. Moreover, in the detection at a specific detection region 101 which may be previously determined as the abnormal region, the transmitting coil 40 can be fixed at the detection region 101, while the second receiving coil 60 can be moved from one detection site 103 to another detection site 103, or multiple second receiving coils 60 can be fixed at multiple detection sites 103 to perform detections at the same time, to obtain an apparent resistivity spatial distribution map of the abnormal region. This detection manner can be called as static emission source type detection. The apparent resistivity spatial distribution map obtained from the static emission source type detection can accurately reflect the real situation of the underground space of the detection region 101, thereby improving exploration accuracy.

At least one of the transmitting coil 40 and the first receiving coil 80 can be flexible, so that the detection region 101 having an irregular or complex shape can be conveniently detected. For example, in detection in mountainous area or forest area, the flexible transmitting coil 40 and the first receiving coil 80 can conveniently vary their shapes to avoid rocks, trees, or bushes. Therefore, the detection apparatus 10 provided in the embodiments of the present disclosure can be used in detection at a complex terrain such as the mountainous area and the forest area to explore the buried unexploded ordnance effectively and accurately.

In an embodiment, the transmitting coil 40 and the first receiving coil 80 are made of flexible metal wires. In an embodiment, the apparatus 10 further includes a flexible tube, and the transmitting coil 40 and the first receiving coil 80 are sleeved in the same flexible tube. In an embodiment, a number of turns (i.e., a winding number) of the second receiving coil 60 is larger than a number of turns (i.e., a winding number) of the first receiving coil 80.

Figure 5:
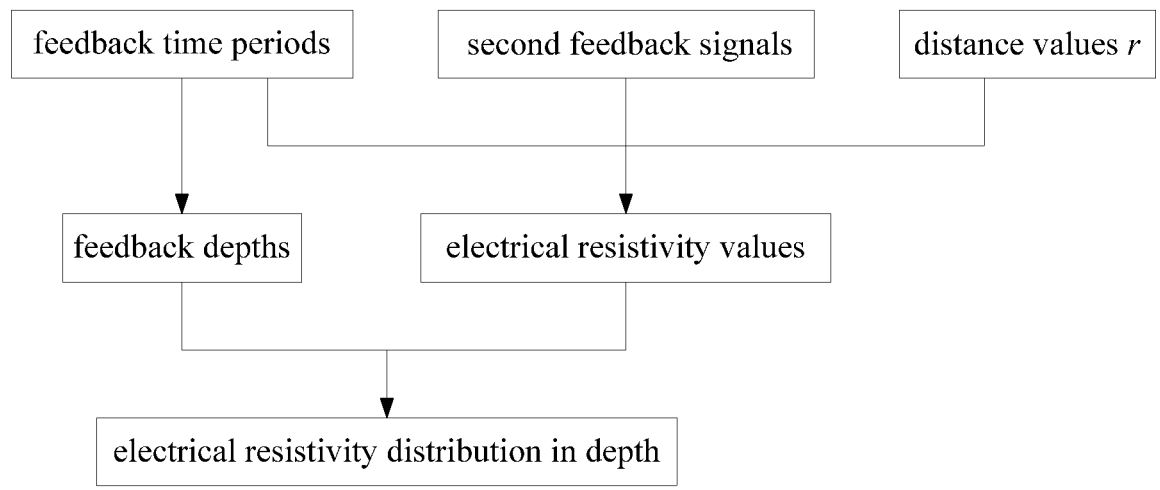
FIG. 5 is a flowchart of a process for obtaining apparent resistivity distribution in depth below each detection site according to an embodiment of the present disclosure.
Figure 6:
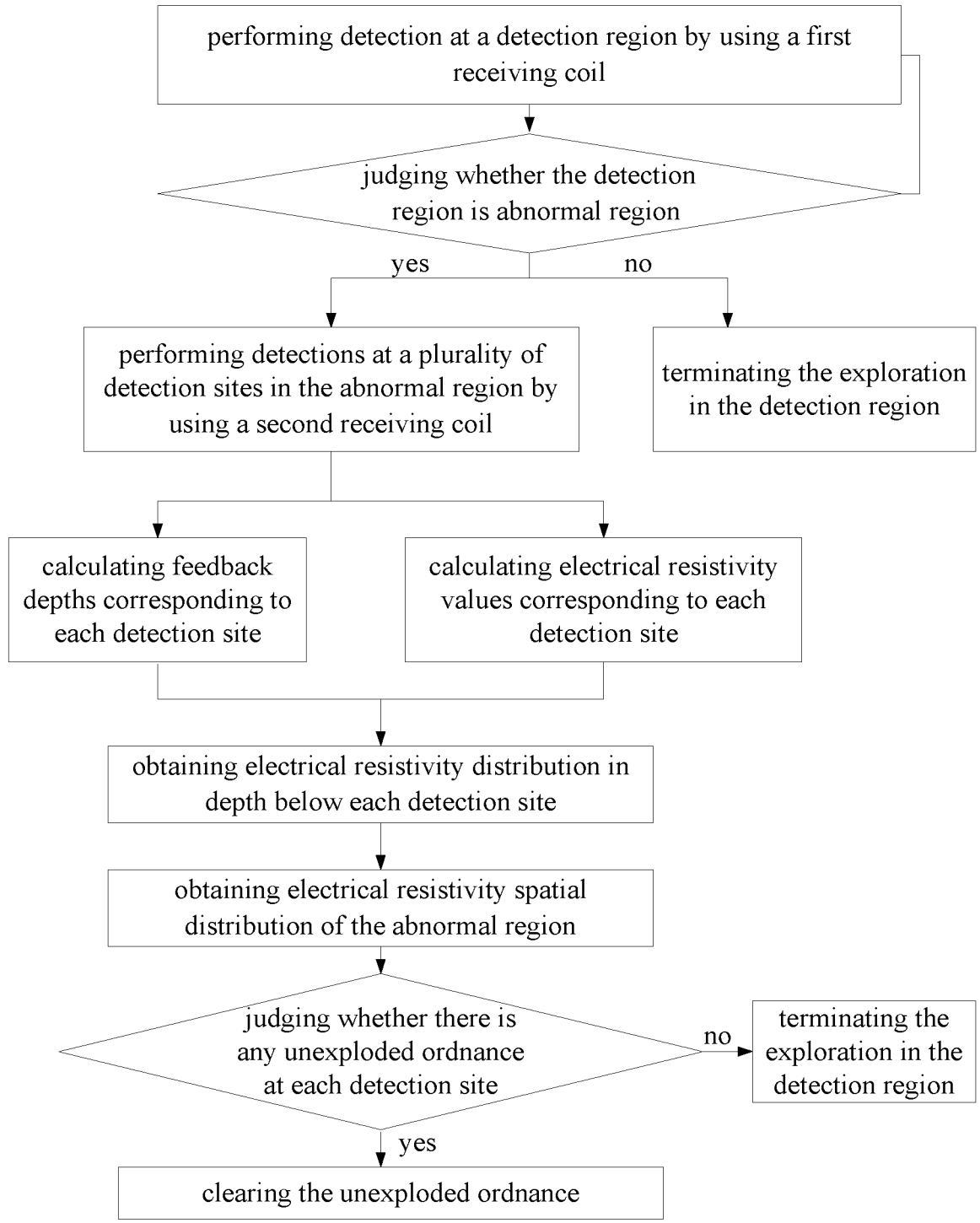
FIG. 6 is a flowchart of a method for discovering an unexploded ordnance according to an embodiment of the present disclosure.

Referring to FIGS. 5 and 6, an embodiment of a detection method for discovering an unexploded ordnance is provided. The method can be, but not limited to be, proceeded by using the above-described detection apparatus 10. The embodiment of the method includes:

S100, surrounding a detection region 101 with a transmitting coil 40, and surrounding a detection site 103 in the detection region 101 with a second receiving coil 60, the detection region may be previously determined as an abnormal region;

S200, conducting the transmitting coil 40 with a second electric current to transmit a second detecting signal to the detection region 101;

S300, respectively acquiring a plurality of second feedback signals at a plurality of second feedback time points, the second feedback signals being second induced electromotive force signals of the second receiving coil 60;

S400, partitioning the transmitting coil 40 into a plurality of dipoles 411, and acquiring a plurality of distance values r respectively between the plurality of dipoles 411 and the detection site 103;

S500, respectively calculating feedback depths according to feedback time periods, the feedback time periods being periods of time between the second feedback time points and an initial time point of the conducting the transmitting coil 40 with the second electric current;

S600, respectively calculating apparent resistivity values corresponding to the feedback depths on the basis of the second feedback signals, the feedback time periods, the distance values r, and the second electric current; and S700, obtaining an apparent resistivity distribution in depth at the detection site according to the apparent resistivity values and the feedback depths, and judging whether there is any unexploded ordnance at the detection site according to the apparent resistivity distribution in depth.

In an embodiment, before S100, the method further includes determining whether the detection region is an abnormal region, and can specifically include:

S010, surrounding the detection region 101 with the transmitting coil 40 and a first receiving coil 80;

S020, conducting the transmitting coil 40 with a first electric current to transmit a first detecting signal to the detection region 101;

S030, respectively acquiring a plurality of first feedback signals at a plurality of first feedback time points, the first feedback signals being first induced electromotive force signals of the first receiving coil 80;

S040, plotting a first curve of the first feedback signals corresponding to the first feedback time points; and S050, judging whether the first curve is an abnormal curve, and determining the detection region 101 as the abnormal region if the first curve being the abnormal curve.

In an embodiment, whether the first curve is an abnormal curve can be judged by comparing the first curve with a reference curve representing the reference signal decaying with time. The reference curve is adopted to reflect the region having no anomaly (i.e., a normal region). The reference curve can be an experience curve, and generally has a relatively smooth decaying trend since the geologic body in the normal region has substantially same electrical conductivity. In the case where a large target area is divided into multiple detection regions 101, multiple first curves corresponding to the multiple detection regions 101 can be plotted. Normally, in the first curves of the first feedback signals, most of the first curves have relatively smooth decaying trend as most of the detection regions 101 are normal regions. Therefore, the reference curve can also be one of the first curves having a relatively smooth decaying trend.

FIG. 3 shows two exemplary curves of induced electromotive forces changing with time, wherein the abnormal curve is plotted according to the first feedback signals corresponding to an abnormal region where an unexploded ordnance simulator is buried, while the reference curve is plotted according to the first feedback signals corresponding to a normal region without the unexploded ordnance simulator. It can be seen that at some first feedback time points, the induced electromotive forces of the abnormal curve are higher than the induced electromotive forces of the reference curve. This is because the unexploded ordnance simulator has a metal shell having a larger electric conductivity than that of the geologic body.

In S400, the transmitting coil 40 can be partitioned into a plurality of sections. Each section functions as one dipole 411. The plurality of sections can have a substantially same length. As the length of the dipole 411 can be small, each dipole 411 can be approximately seen as a straight line. In an embodiment, the dipoles 411 can have an equal length, and the step of partitioning the transmitting coil 40 into a plurality of dipoles 411 can include obtaining the length of the dipoles 411 and partitioning the transmitting coil 40 according to the length of the dipoles 411.

The length of the dipoles 411 can be selected according to needs. In an embodiment, the locating device 70 can locate multiple points of the transmitting coil 40 to obtain coordinates of the multiple points by moving along the transmitting coil 40. In an embodiment, the multiple points can be turning points of an irregular shaped transmitting coil 40, or uniformly spaced points (the black triangles in FIG. 2) of the transmitting coil 40, so that the transmitting coil 40 can be approximately seen as a polygon having a plurality of sides 410 divided by the multiple points. A center of the area surrounded by the transmitting coil 40 (i.e., the detection region 101) can be determined by averaging the coordinates (e.g., absolute coordinates) of the multiple points of the transmitting coil 40.

In an embodiment, in S400, the steps of obtaining the length of the dipoles 411 and partitioning the transmitting coil 40 into the plurality of dipoles 411 can include:

S410, respectively acquiring first distances respectively between central points of the sides 410 and the center of the area surrounded by the transmitting coil 40 (i.e., the detection region 101);

S420, selecting a minimum distance from the first distances; and

S430, setting the length of the dipoles 411 as 1/N of the minimum distance, wherein N≥20.

In an embodiment, S410 can include:

S411, acquiring coordinates of the multiple points defining the sides 410;

S412, obtaining a stimulated profile of the transmitting coil 40 according to the coordinates of multiple points;

S413, calculating the first distances respectively between the central points of the sides 410 and the center of the area surrounded by the transmitting coil 40 according to the stimulated profile of the transmitting coil 40.

In an embodiment, S411 can include:

S4111, determining a reference site in the detection region 101 and acquiring an absolute coordinate of the reference site;

S4112, measuring relative coordinates of the multiple points with respect to the reference site by a real-time kinematic locating device; and S4113, acquiring the absolute coordinates of the multiple points according to the absolute coordinate of the reference site and the relative coordinates of the multiple points with respect to the reference site.

Referring to FIG. 3, in an embodiment, in S400, the acquiring the plurality of distance values r can include:

respectively acquiring relative coordinates (x, y) of the dipoles 411 with respect to the detection site 103, and calculating the distance value r according to $r=(x^2+y^2)^{1/2}$, wherein y is a perpendicular distance from the detection site 103 to the dipole 411, and x is a perpendicular distance from the detection site 103 to a perpendicular bisector of the dipole 411.

In an embodiment, the relative coordinates (x, y) of the dipoles 411 with respect to the detection site 103 can be obtained by a real-time kinematic locating device, such as the locating device 70 of the transient electromagnetic field detection apparatus 10. The real-time kinematic locating device 70 can locate the detection site 103, and move along the transmitting coil 40 to obtain the relative coordinates (x, y) of the dipoles 411 with respect to the location of the detection site 103.

In an embodiment, in S500, each feedback depth is calculated according to the following formula (I):

$$D_{TD} = \sqrt{\frac{t}{\mu_D \sigma_D}} \quad (I)$$

wherein $D_{TD}$ is the feedback depth, t is the feedback time period between the initial time point and the second feedback time point, $\mu_D$ is a magnetic conductivity of the geologic body, and $\sigma_D$ is an electric conductivity of the geologic body.

In an embodiment, in S600, each apparent resistivity value corresponding to a specific feedback depth is obtained by the following steps:

S610, assigning an assumed value to electrical resistivity;

S620, calculating a calculated induced electromotive force on the basis of the assumed value of the electrical resistivity, the feedback time period corresponding to the feedback depth, the length of the dipoles, the relative coordinates (x, y) of the dipoles, and the second electric current;

S630, comparing the calculated induced electromotive force and the second feedback signal (i.e., the measured induced electromotive force signal) corresponding to the feedback depth; and S640, determining the assumed value of the apparent resistivity as a true value of the apparent resistivity corresponding to the specific feedback depth if a difference between the calculated second induced electromotive force and the second feedback signal is equal to or smaller than a threshold value; and returning back to S610 to assign another assumed value to the apparent resistivity and repeating S620 to S640 if the difference is larger than the threshold value.

In an embodiment, in S610, the assumed value of the apparent resistivity can be selected from apparent resistivity values of metals, such as copper or iron, which are generally used to make the shells of the ordnances.

In an embodiment, in S620, the calculated induced electromotive force are calculated by the following steps:

S621, calculating a secondary magnetic field generated in response to a primary magnetic field created by each dipole according to the following equations:

$$h_z(x, y) = \frac{I \times dl \times y}{4\pi r^3} \times \left[\left(1 - \frac{3}{2u^2}\right) \mathrm{erf}(u) + \frac{3}{u\sqrt{\pi}} e^{-u}\right] \quad (2)$$

$$u = [\mu_0 r^2/(4\rho t)]^{1/2} \quad (3)$$

$$r = (x^2 + y^2)^{1/2} \quad (4)$$

wherein $h_z$ (x, y) is the calculated value of the secondary magnetic field for each dipole, I is the second electric current, dl is the length of the dipole, erf(u) is an error function of u, $\mu_0$ is a magnetic conductivity of vacuum, $\rho$ is the assumed value of the electrical resistivity, and t is the feedback time period;

S622, calculating a sum of all secondary magnetic fields for all dipoles; and

S623, calculating the calculated induced electromotive force by using the sum of the secondary magnetic fields according to law of electromagnetic induction.

In an embodiment, the calculated induced electromotive force is calculated according to the flowing equation:

$$E = nS\Delta B/\Delta t$$

wherein n is number of turns of the transmitting coil 40, E is the calculated induced electromotive force, S is an area of the region surrounded by the transmitting coil 40, B is magnetic flux density, which equals to the sum of the secondary magnetic fields multiplied by $\mu_0$.

In an embodiment, in S700, the judging whether there is any unexploded ordnance at the detection site can include:
comparing the apparent resistivity distribution in depth at the detection site with a reference apparent resistivity distribution in depth at a normal detection site having no anomaly (i.e., with no unexploded ordnance buried therebelow; and
judging there may be an unexploded ordnance buried below the detection site if the apparent resistivity corresponding to a certain feedback depth in the apparent resistivity distribution is larger than the apparent resistivity corresponding to the same feedback depth in the reference apparent resistivity distribution.

In an embodiment, a plurality of detection sites 103 are determined in the detection region 101, the apparent resistivity distribution in depth at each of the plurality of detection sites 103 are obtained.

In an embodiment, S700 can include:
obtaining location information of the plurality of detection sites 103;
obtaining an apparent resistivity spatial distribution of the detection region 101 according to the apparent resistivity distribution in depth at each of the plurality of detection sites 103 and the location information of the plurality of detection sites 103; and
judging whether there is any unexploded ordnance at each detection site 103 according to the apparent resistivity spatial distribution of the detection region 101.

The steps of S500 to S700 can be executed by the controller 20 of the transient electromagnetic field detection apparatus 10. The controller 20 can include a memory storing software and/or programs and a processor to execute the software and/or programs, thereby executing steps of S500 to S700.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:
1. A detection method for discovering an unexploded ordnance, comprising:
surrounding a detection region with a transmitting coil and surrounding a detection site in the detection region with a second receiving coil;
conducting the transmitting coil with a second electric current to transmit a second detecting signal to the detection region;
respectively acquiring a plurality of second feedback signals at a plurality of second feedback time points, the second feedback signals being second induced electromotive force signals of the second receiving coil;
partitioning the transmitting coil into a plurality of dipoles, and acquiring a plurality of distance values r respectively between the plurality of dipoles and the detection site;
respectively calculating feedback depths according to feedback time periods, the feedback time periods being periods of time between the second feedback time points and an initial time point of the conducting the transmitting coil with the second electric current;
respectively calculating apparent resistivity values corresponding to the feedback depths on the basis of the second feedback signals, the feedback time periods, the distance values r, and the second electric current;
obtaining an apparent resistivity distribution in depth at the detection site according to the apparent resistivity values and the feedback depths; and
judging whether there is any unexploded ordnance at the detection site according to the apparent resistivity distribution in depth.

2. The detection method of claim 1, further comprising:
surrounding the detection region with the transmitting coil and a first receiving coil;
conducting the transmitting coil with a first electric current to transmit a first detecting signal to the detection region;
respectively acquiring a plurality of first feedback signals at a plurality of first feedback time points, the first feedback signals being first induced electromotive force signals of the first receiving coil;

plotting a first curve of the first feedback signals corresponding to the first feedback time points; and judging whether the first curve is an abnormal curve, and determining the detection region as an abnormal region when the first curve being the abnormal curve.

3. The method of claim 1, wherein the acquiring the plurality of distance values r respectively between the plurality of dipoles and the detection site comprises:

respectively acquiring relative coordinates (x, y) of the dipoles with respect to the detection site, and calculating the distance value r according to r=$(x^2+y^2)^{1/2}$, wherein y is a perpendicular distance from the detection site to the dipole, and x is a perpendicular distance from the detection site to a perpendicular bisector of the dipole.

4. The method of claim 1, wherein each feedback depth is calculated according to the following formula (I):

$$D_{TD} = \sqrt{\frac{t}{\mu_D \sigma_D}} \quad (I)$$

wherein $D_{TD}$ is the feedback depth, t is the feedback time period, $\mu_D$ is a magnetic conductivity of geologic body, and $\sigma_D$ is an electric conductivity of geologic body.

5. The method of claim 3, wherein the plurality of dipoles have a substantially same length.

6. The method of claim 5, wherein each apparent resistivity value corresponding to a specific feedback depth is obtained by:

S610, assigning an assumed value to electrical resistivity;

S620, calculating a calculated induced electromotive force on the basis of the assumed value of the electrical resistivity, the feedback time period corresponding to the specific feedback depth, the length of the dipoles, the relative coordinates (x, y) of the dipoles, and the second electric current;

S630, comparing the calculated induced electromotive force and the second feedback signal corresponding to the feedback depth; and S640, determining the assumed value of the apparent resistivity as a true value of the apparent resistivity corresponding to the specific feedback depth when a difference between the calculated second induced electromotive force and the second feedback signal is equal to or smaller than a threshold value; and returning back to S610 to assign another assumed value to the apparent resistivity and repeating S620 to S640 when the difference is larger than the threshold value.

7. The method of claim 6, wherein the assumed value of the apparent resistivity is selected from apparent resistivity values of metals.

8. The method of claim 6, wherein the calculated induced electromotive force is calculated by:

calculating a secondary magnetic field generated in response to a primary magnetic field created by each dipole according to the following equations (2) and (3):

$$h_z(x, y) = \frac{I \times dl \times y}{4\pi r^3} \times \left[\left(1 - \frac{3}{2u^2}\right)\mathrm{erf}(u) + \frac{3}{u\sqrt{\pi}}e^{-u}\right] \quad (2)$$

$$u = [\mu_0 r^2/(4\rho t)]^{1/2} \quad (3)$$

wherein $H_z$ (x·y) is the calculated value of the secondary magnetic field for each dipole, I is the second electric current, dl is the length of the dipole, erf(u) is an error function of u, $\mu_0$ is a magnetic conductivity of vacuum, ρ is the assumed value of the electrical resistivity, and t is the feedback time period;

calculating a sum of all secondary magnetic fields for all dipoles; and calculating the calculated induced electromotive force by using the sum of the secondary magnetic fields according to law of electromagnetic induction.

9. The method of claim 1, wherein the plurality of dipoles have a substantially same length, the partitioning the transmitting coil into the plurality of dipoles comprises:

obtaining the length of the dipole; and partitioning the transmitting coil according to the length of the dipole, wherein the obtaining the length of the dipole comprises:

defining multiple sides with multiple points of the transmitting coil;

respectively acquiring first distances respectively between central points of the sides and the center of an area surrounded by the transmitting coil;

selecting a minimum distance from the first distances; and setting the length of the dipole as 1/N of the minimum distance, wherein N≥20.

10. The method of claim 9, wherein the respectively acquiring the first distances comprises:

acquiring coordinates of the multiple points defining the multiple sides;

obtaining a stimulated profile of the transmitting coil according to the coordinates of the multiple points; and calculating the first distances according to the stimulated profile of the transmitting coil.

11. The method of claim 10, wherein the acquiring coordinates of the multiple points comprises:

determining a reference site in the detection region and acquiring an absolute coordinate of the reference site;

measuring relative coordinates of the multiple points with respect to the reference site by a real-time kinematic locating device; and acquiring the coordinates of the multiple points according to the absolute coordinate of the reference site and the relative coordinates of the multiple points with respect to the reference site.

12. The method of claim 1, further comprising determining a plurality of detection sites in the detection region, and the obtaining an apparent resistivity distribution in depth at the detection site is obtaining the apparent resistivity distribution in depth at each of the plurality of detection sites.

13. The method of claim 3, wherein the relative coordinates (x, y) of the dipoles with respect to the detection site are respectively obtained by a real-time kinematic locating device.

14. A transient electromagnetic field detection apparatus that is capable of performing the method of claim 1, the apparatus comprising:

the transmitting coil configured to surround the detection region;

the second receiving coil configured to surround the detection site in the detection region;

a transmitting device electrically connected to the transmitting coil, configured to conduct the transmitting coil with the second electric current, and further configured to record the initial time point of the conducting the transmitting coil with the second electric current;

a receiving device electrically connected to the second receiving coil, configured to respectively acquire the plurality of first feedback signals at the plurality of first feedback time points, and further configured to record the first feedback time points; and a controller respectively and electrically connected to the transmitting device and the receiving device; and a locating device electrically connected to the controller and configured to acquire relative coordinates (x, y) of the dipoles with respect to the detection site and transmit the relative coordinates (x, y) to the controller, wherein y is a perpendicular distance from the detection site to the dipole and x is a perpendicular distance from the detection site to a perpendicular bisector of the dipole;

wherein the controller is configured to calculate the plurality of distance values r according to the relative coordinates (x, y).

15. The apparatus of claim 14, further comprising a first receiving coil electrically connected to the receiving device and configured to surround the detection region, wherein the transmitting device is further configured to conduct the transmitting coil with a first electric current to transmit a first detecting signal to the detection region;

the receiving device is further configured to respectively acquire a plurality of first feedback signals at a plurality of first feedback time points, the first feedback signals being first induced electromotive force signals of the first receiving coil; and the controller is configured to receive the first feedback signals and the first feedback time points, plot a first curve of the first feedback signals corresponding to the first feedback time points, and judge whether the first curve is an abnormal curve.

16. The apparatus of claim 15, wherein at least one of the transmitting coil and the first receiving coil is flexible.

17. The apparatus of claim 15, wherein a number of turns of the second receiving coil is larger than a number of turns of the first receiving coil.

18. The apparatus of claim 15, wherein the locating device is a real-time kinematic locating device.

* * * * *